INVENTORS
GARY E. LOVELL
TOM E. CONOVER

BY Seyhane, Rothwell, Mion, Zinn & Macpeak
ATTORNEYS

May 13, 1969 G. E. LOVELL ET AL 3,444,528

REDUNDANT COMPUTER SYSTEMS

Filed Nov. 17, 1966 Sheet 2 of 5

3,444,528

REDUNDANT COMPUTER SYSTEMS

Gary E. Lovell, Littleton, Colo., and Tom E. Conover, Bellevue, Wash., assignors to Martin-Marietta Corporation, New York, N.Y., a corporation of Maryland Filed Nov. 17, 1966, Ser. No. 595,162
Int. Cl. G06f *11/08, 13/00*
U.S. Cl. 340—172.5 11 Claims

ABSTRACT OF THE DISCLOSURE

A computer system comprising a pilot and a copilot computer, each receiving identical inputs and performing the same computer function, the programs of both being identical but normally providing only a single real output from the pilot computer. The pilot and copilot computers, however, are coupled together such that when a malfunction occurs in the pilot computer, power is transferred from the pilot output circuits to the normally deactivated copilot output circuits to obtain a real output therefrom. Malfunction in the copilot computer, on the other hand, will prevent the above-mentioned power transfer from taking place. Additionally, run away or lock-up of the pilot will not prevent power transfer and the run away or lock-up of the copilot will not cause a transfer.

The invention is a system and process relating to the interconnection of computers for the purpose of insuring maximum reliability in computer operations. More particularly, the invention relates to a redundant system and process wherein a first computer recieves inputs and controls the output and a second computer receives inputs and performs the same operation as the first computer, but does not control the output unless there is a failure in the first computer.

In certain types of computer operations it is necessary to achieve maximum reliability of the operating system. For example, if the computer which controls the flight of a missile happens to fail, it is desirable to have a substitute computer take over the operation. In such instances, it is necessary to include some type of means for controlling take-over of operation by the second computer.

In prior art redundant systems, a third system is used as a reference. The third system checks and/or cross checks the operations of the two main systems and transfer control to the error free system when an error occurs in the controlling system. Such systems are not protected against malfunction of the third system.

In the present invention, two computers are used, and their own system components are interconnected in such a manner that an external third reference system is not needed to perform checks on the operations of the two computers. In general, a pilot computer and a copilot computer are used. The particular operation is not important to the present invention, but for ease of explanation it will be assumed that the purpose of the computer is to control flight of a missile.

According to an aspect of the invention, both computers are identical and both receive inputs from the system to be controlled. In the example mentioned above, inputs would be applied from the accelerometers, gyroscopes, etc. and the final output or outputs would be applied to flight controlling elements of the missile. Both the pilot and the copilot perform the desired calculations upon the input signals in accordance with their programs, the programs of both being identical. However, power is applied only to the pilot output circuitry and thus the actual or real output is controlled only by the pilot. When a failure occurs in the pilot, the power is transferred from the pilot output circuits to the copilot output circuits and thus the copilot takes over control of the missile flight. The invention also prevents failures in the copilot from affecting the operation of the pilot and vice versa. In other words, a failure in the copilot will not cause the power to be transferred from the pilot output circuitry to the copilot output circuitry. Also the invention prevents the output from being affected by a computer lockup or computer run-away and protects against any single malfunction in the input/output circuitry of either computer from rendering the other inoperative.

Although the example given relates to the use of the invention with a digital flight computer, it should be understood that the particular main purpose of the computer forms no part of the present invention. General purpose computers may be used and many programs are known today for instructing the components of the computer to operate in a desired manner. The present invention has applicability to computers responding to any program for causing a computer to perform the main function. The main function is herein defined as the desired use of the computer in response to the program. For example, if the computer is programmed to solve the digital flight equation, that is its main function.

It is also well known that computers may contain so-called sub-routines or branch programs. When a certain event occurs, such as a signal in a proper place, the computer jumps or branches to the sub-routine program which is stored in the computer. Many methods and systems for performing branching in response to an event are well known in the art and no specific ones will be described herein.

The present invention, in the overall combination, makes use of three branch or sub-routines. However, it should be noted that the particular sub-routines used are not part of the present invention, but depend upon the type of computers used and the main function of the computer. The important concern of the present invention is when and how the event occurs to cause the computers to branch or jump to the sub-routine.

The first sub-routine of interest is the well known self-check program. Often, today, computers are delivered with self-check programs which check all computer components. Many such operations are well known. The more sophisticated ones provide indication of the component which fails. In accordance with the present invention, in its broadest aspect, it is only necessary to use a sub-routine program which gives a "Yes" or "No" output as to whether there is any failure at all or no failure at all.

The other sub-routines used may be referred to as "software traps."

A software trap is merely a program which prevents an incorrectly operating computer from performing in an undesired manner. The particular program depends upon the particular computer and/or main function of the computer. As an example, the software trap or program may be identical to the self-check program for the particular computer. As noted, self-check programs are old and many computers today are delivered with such programs. The particular self-check program, or for that matter, the particular software trap program is of no concern to the present invention.

As an example of a self-check program used as a software trap, assume that a general computer operates such that when a pair of registers are set, the computer performs a critical operation. That operation could be transferring control from another computer to itself. Thus if the two registers are falsely set, control would be transferred to a malfunctioning computer. To prevent this, the two registers are arranged so that when the first is set, it provides an output which causes the computer to branch to a self-check sub-routine. If there are no errors detected the self-check program causes an output to be generated which sets the second register. Both registers now being set, power is transferred from another computer to itself.

If a computer malfunction originally caused the first register to be set, power would not be transferred because the second register would never be set. The self-check routine would indicate an error somewhere and thus would never provide an output to set the second register.

Since most any main program can be used with the computers and since sub-routines of self-check and software traps depend upon the computer and its main function, and furthermore since main programs, self-check routines, and software traps are individually well known in the art, no particular programs will be described in detail.

Before entering into a detailed discussion of the invention, a general overall description will assist in an understanding thereof. Two computers are used for operating upon input data in an identical manner. The inputs are applied to the input circuitry of both computers and the memory and processor portions of the computer respond to the computer programs to provide the digital output which is desired in the computer output register. The digital information in the output registers of the pilot and copilot computers are fed to the output units of the pilot and copilot respectively which include means for converting the digital information into usable analog information and far applying the resultin rgeal output to the system which is being controlled by the computer or to any other system. During normal operation, power is applied only to the pilot output unit thereby causing the pilot alone to control the real output. After each calculation, the real output is fed back through the input circuitry of both the pilot and copilot, and each computer compares the real output, after conversion into digital form, with the internally generated output. If both comparisons are favorable, the computers enter into the next calculation in response to the next sampled inputs. However, if either comparison is unfavorable, the normal program of the two computers is interrupted and a different operation takes place. If both computers have indicated a false comparison, that means that the output unit of the pilot is malfunctioning and therefore transfer of power takes place. However, if one of the comparisons is favorable and the other is unfavorable, then both computers branch to the self-check sub-routine program. At the end of the self-check routine, if both computers show no malfunction, the error was probably transient and the system goes back to the regular program and a new calculation begins. However, if the result of the pilot self-check shows a malfunction and the result of the copilot self-check shows no malfunction, the power supply will be transferred from the pilot output unit to the copilot output unit thereby allowing the copilot to take over the control of the system.

It is an object of the present invention to provide a dual redundant computer system and method which eliminates the need of a third reference system for checking the computers.

It is a further object of the present invention to provide a dual redundant computer system and method which prevents any single failure in one of the computers from affecting the operation of the other computer.

The foregoing and other objects, features and advantages of the invention will be apparent from the following more particular description of preferred embodiments of the invention, as illustrated in the accompanying drawings.

Figure 1:
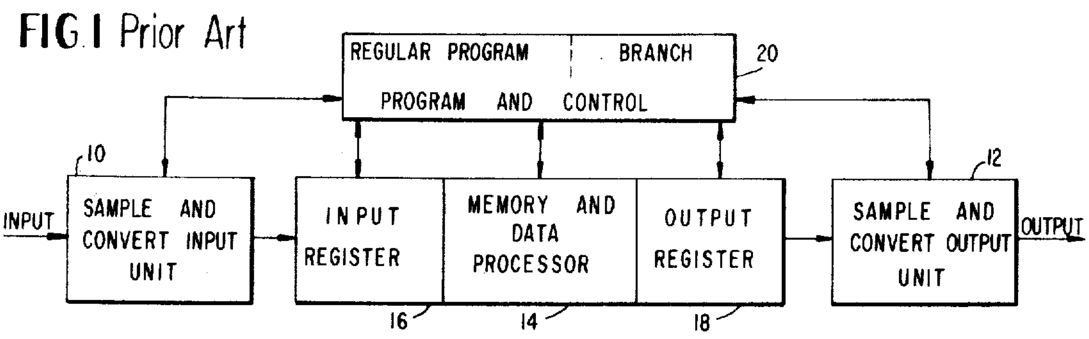
FIG. 1 Prior Art
FIGURE 1 is a block diagram of a prior art general purpose computer.

Referring to FIGURE 1 there is shown a prior art computational system for receiving inputs, operating upon the inputs in accordance with a desired program, and providing an output. The basic units are an input unit 10 which may include sample and converting means for converting analog information into digital information, an output unit 12 which receives the digitally generated output from the data processor and converts it and/or transmits it to the overall system output, a memory and data processor 14, input and output registers 16 and 18 respectively for the memory and data processor, and a program and control unit 20. Since the general operation of computers is well known, it will not be described herein. It should be noted, however, that although the program and control unit is shown as a separate entity from the memory and processor unit, it will be well understood by those having ordinary skill in the art that in fact the two units are not separate entities. They are merely separate functions performed by the same overall entity. This is especially true in cases of stored programs. The program and control unit is shown as a separate entity only to facilitate an understanding of the present invention, but at any rate it will be obvious to anyone having ordinary skill in the art that a computer in response to its program, whether stored or not stored in the computer memory, can be made to apply signals to any of the logical entities in any sequence desired. Although remembering that these signals come from the overall unit and are applied to circuitry within the overall unit, they are shown as coming from the program and control functional portion of the unit.

Figure 2:
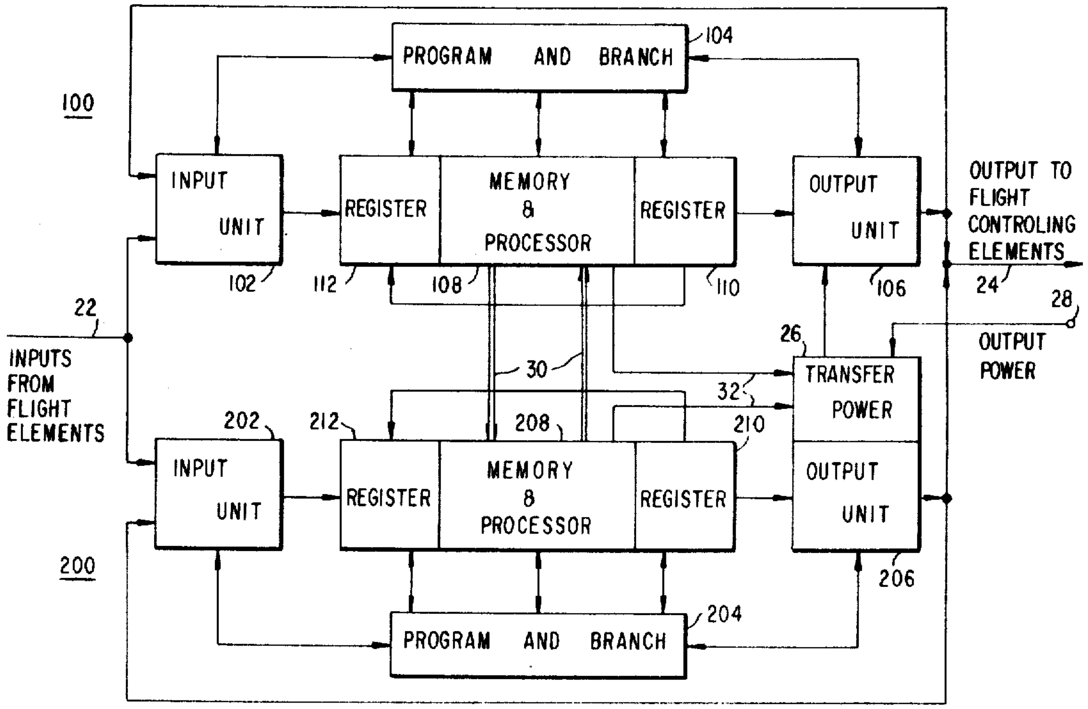
FIGURE 2 is a block diagram of a pair of general purpose computers interconnected in accordance with the present invention.

FIGURE 2 shows a general block diagram of the overall system and includes pilot computer 100 and copilot computer 200. The computers are typical prior art computers as shown in FIGURE 1 and contain the same components. However, both computers receive the same inputs, operate in the same manner to generate the same outputs and are interconnected via leads 30, to be explained in more detail hereinafter, to perform the redundancy operation. The output power is applied at point 28 to the transfer power unit 26 which supplies the power either to pilot output unit 106 or copilot output unit 206, under control of information from the pilot and copilot on leads indicated generally at 32. The real output at 24, which is an actuality controlled by only one of the computers, is fed back to the input units 102 of the pilot and 202 of the copilot. Also, there is a feedback connection from computer output register 110 to computer input register 112 of the pilot, and from computer output register 210 to computer input register 212 of the copilot. It will be obvious to those skilled in the art that the feedback from output registers to input registers may be via the output and input units rather than directly from register to register, or as disclosed in FIGURE 4, the feedback may be from the output register directly to a logical unit in the memory and processor portion of the computer.

Figure 3A:
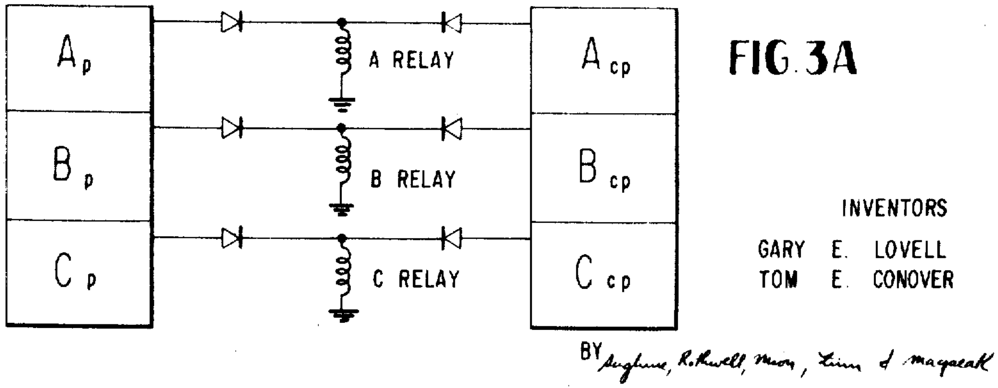
FIGURES 3 through 6 are diagrams illustrating a preferred embodiment of the details of the portions of the blocks shown generally in FIGURE 2.
Figures 3B, 4:
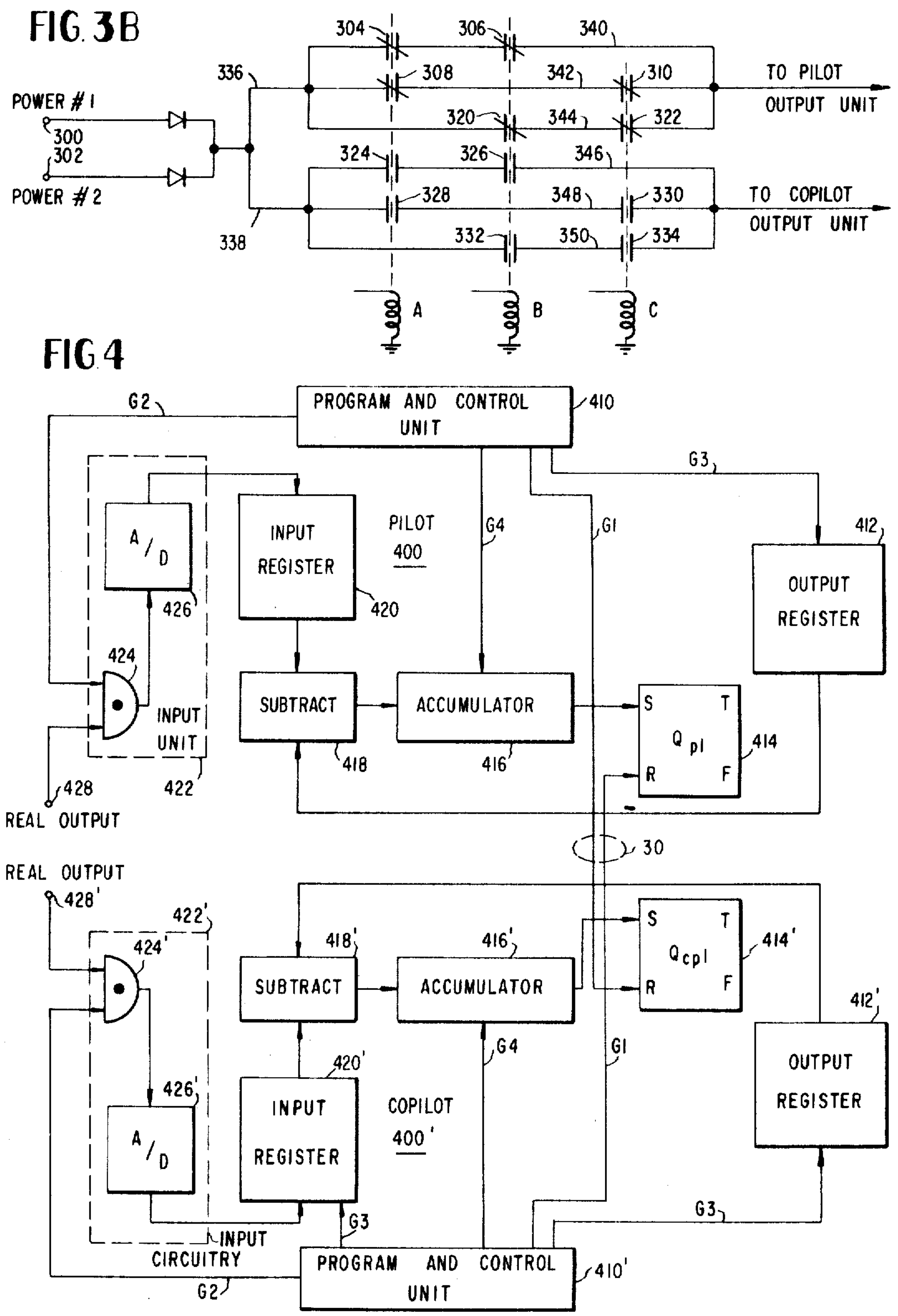

The circuitry for transferring power from the pilot output unit to the copilot output unit is shown in FIGURES 3A and 3B. The system and method for generating the transfer power signal will be described hereinafter, but for the present, assume a transfer power signal is generated. Upon receipt of such a signal, the pilot computer sets registers $A_p$, $B_p$ and $C_p$ and the copilot sets registers $A_{cp}$, $B_{cp}$ and $C_{cp}$. The outputs from the A registers are applied to energize an A relay, the output of the B registers are applied to energize a B relay and the output of the C registers are applied to energize a C relay. It is only necessary that one of the two registers serving any given relay be set in order to energize that relay. In other words, if $A_p$ is set, but $A_{cp}$ is not set, relay A will be energized. The lead lines from the registers, which are in the respective computers, to the relays, which are in the transfer power unit 26 (shown in FIGURE 2), are indicated generally by lines 32 of FIGURE 2. It is seen that for any given relay the redundancy of registers prevents a single failure from harming the operation. That is, when a transfer power signal is received, if the $A_{cp}$ register fails, the $A_p$ register will still energize relay A.

Three relays are used rather than a single one in order to allow a majority voting scheme to transfer the power. Consequently, any one of the three relays may fail completely and still power will be transferred from the pilot to the copilot when a transfer power signal is received.

A preferred embodiment of the actual linkage for transferring the power is shown in FIGURE 3B wherein relays A, B and C are the same as relays A, B and C of FIGURE 3A. In accordance with the redundancy concept, two power supplies are used. Power supply No. 1 is applied at terminal 300 and power supply No. 2 is applied at terminal 302, and therefore, if one of the power supplies completely fails the other will be sufficient to enable the operation to be maintained. The power is applied to the pilot output branch 336 and the copilot output branch 338. Each branch is further subdivided into three sub-branches. For example, pilot branch 336 is subdivided into sub-branches 340, 342 and 344. Copilot branch 338 is subdivided into sub-branches 346, 348 and 350. Each sub-branch includes a pair of switches and each switch is controlled by one of the relays A through C. Switches 304 through 322 in the pilot branch are normally closed. That is, as long as the relays are unenergized, the switches are in closed condition. Thus, power from either power supply No. 1 or No. 2 will be applied through all three of the sub-branches to the pilot output unit. On the other hand, the switches 324 through 334 of the copilot sub-branches are normally in the open position thereby preventing power from being applied to the copilot output unit.

As is apparent from the drawing, each relay controls switches in two of the three sub-branches in each of the pilot and copilot branches. For example, relay A controls switches 304, 308, 324 and 328. Prior to receiving a transfer power signal, power should be applied to the pilot output unit. That is accomplished by the pilot branch 336 and any of the sub-branches since all of the switches are closed. If any one of the relays is erraneously energized, power will still not be transferred. For example, if relay B is erraneously energized, switches 306 and 320 will open, thereby preventing power from being applied via sub-branches 340 and 344, but switches 308 and 310 remain closed providing a path on sub-branch 342 between the power supply and the pilot output unit. The same relay B, when erraneously energized, will close switches 326 and 332 of copilot sub-branches 346 and 350 respectively. However, each of those sub-branches includes an additional switch which remains open thereby preventing power from being transmitted to the copilot.

When a transfer power signal is applied, if all A, B and C registers and the A, B and C relays are operating correctly, all switches in the three sub-branches of the pilot branch will be opened and all switches in the sub-branches of the copilot branch will be closed, resulting in a transfer of power from the pilot to the copilot. If one of the relays fails, the energization of the other two will be sufficient to transfer power. For example, if relay A fails thereby maintaining switches 304 and 308 in the closed position, and switches 324 and 328 in the open position, power will still be transferred. Relay B opens switch 306 removing sub-branch 340 and relay C opens switch 310, removing sub-branch 342. Sub-branch 344 is removed from the circuit by both relays B and C. Relays B and C also close switches 332 and 334 thereby inserting sub-branch 350 of the copilot branch into the circuit for providing the power to the copilot.

Although relays, mechanical switches and mechanical linkages are illustrated in FIGURE 3B for implementing the majority voting scheme of the transfer power unit, it will be apparent to those having ordinary skill in the art that electronic means may be used as well. For example, the A, B and C registers may provide output pulses which are applied to electronic switches corresponding to the mechanical switches shown in FIGURE 3B.

The decision function of the invention is controlled by the states of four status indicators referred to hereinafter as the $Q_{p1}$, $Q_{cp1}$, $Q_{p2}$, and $Q_{cp2}$ flip-flops. The subscript *p* indicates that the flip-flop is a part of the pilot computer and the subscript *cp* indicates that the flip-flop is a part of the copilot computer. The inputs and outputs to the above flip-flops or registers provide the basic interconnections between the copilot and pilot computers. The state of the flip-flops indicates the status of a checking operation. For example, when the pilot checks the real output against its internally generated output, if the values are the same within a predetermined small limit, the $Q_{p1}$ register is set thereby indicating a true check. When the copilot checks the real output against its internally generated output, a difference between the two which is less than the predetermined limit will cause the register $Q_{cp1}$ to be set thereby providing a true output. The combined states of $Q_{p1}$ and $Q_{cp1}$ indicate the results of the first check operation and determine whether the computers will transfer power, jump to a sub-routine program, or continue normal calculations with power maintained on the pilot output circuits. Those portions of the pilot and copilot computers which control the states of $Q_{p1}$ and $Q_{cp1}$ are shown in FIGURE 4.

Referring to the pilot 400 of FIGURE 4, there is shown a program and control unit 410 which corresponds with the programming control unit 104 of FIGURE 2, an output register 412 which corresponds with the output register 110 of FIGURE 2, an input register 420 which corresponds with input register 112 of FIGURE 2, and an input unit 422 which corresponds with input register 102 of FIGURE 2. The subtractor circuit 418, accumulator 416, and flip-flop 414 are components in the memory and processor 108 of FIGURE 2. That portion of the input unit 422 which enters into the control of the state of the $Q_{p1}$ flip-flop 414 includes AND gate 424 and analog to digital converter 426. Corresponding components are shown for the copilot 400' in FIGURE 4 with all components being designated by the same numbers primed. As will be understood by those having ordinary skill in the art, the programming control unit controls the sequence of operation.

At the beginning of each sequence, the programming and control unit 410 of the pilot provides an output on $G_1$ which is connected to the copilot and places the $Q_{cp1}$ in the false state. The programming and control unit 410' of the copilot provides an output on its lead $G_1$ which is connected to the reset input of the $Q_{p1}$ flip-flop to put that flip-flop in the false state. Consequently, at the beginning of each sequence, both of the status flip-flops indicate false and will not be set into the true states unless the favorable comparison occurs when the output is checked. Thus, if one of the computers locks up and fails to complete the checking of the output, the status flip-flop for that computer will remain in the false condition thereby indicating that something is wrong. After the two status flip-flops are placed in the false state, the system performs its so-called normal operation, which in our example is to sample inputs and calculate an output in accordance with the digital flight equation. At the end of that calculation, the pilot output register 412 contains the digital output which has been internally generated by the pilot computer, and the copilot output register 412' contains the digital output which has been internally generated by the copilot computer. Referring back to FIGURE 2, it is seen that the output unit 106 of the pilot is provided with power and therefore the real output at terminal 24, which in our example is an analog output, is controlled only by the pilot computer.

Following each calculation, both computers perform a so-called output checking operation. Since the operation is the same for both the pilot and copilot, only the pilot operation will be described. The real output is fed back through the input unit 422 to the input register 420 of the pilot 400. This may be accomplished by an AND gate 424 and an analog to digital converter 426 in the input unit 422. The signal on lead $G_2$ from the programming control unit is the first occurrence signal after each calculation and passes the real output into the analog to digital converter 426 where it is converted into a digital value and placed in the input register 420. As previously explained, the output register 412 contains the internally generated output of the pilot. Following conversion of the real output back into digital form, the contents of the input register 420 is compared with the contents of the output register 412 in the processor portion of the pilot computer. One embodiment for performing the comparison comprises a subtraction means 418 and an accumulator 416. The purpose of the accumulator is to provide an output to the set terminal of flip-flop 414 when the input thereto is below a predetermined limit. In other words, if the difference between the contents of the output register and the contents of the input register is less than some predetermined limit, the $Q_{p1}$ flip-flop 414 will be set in the true state indicating a favorable comparison. However, if the difference is greater than the predetermined limit, the accumulator 416 will not provide an output thereby allowing $Q_{p1}$ flip-flop 414 to remain in the false state indicating an unfavorable comparison or a lock-up. The leads $G_1$ through $G_4$ indicate that the timing of the operation is controlled by the program.

The dotted circle 30 merely indicates that the lines passing therethrough are connected between the pilot and the copilot as shown. Following the so-called output check, the status flip-flops $Q_{p1}$ and $Q_{cp1}$ are sampled to determine their states. The sampling means should be adapted to perform the following functions: If $Q_{p1}$ and $Q_{cp1}$ are both true, the output of the sampling means should be a signal which is fed to the programming control unit to cause the beginning of a new calculation. That is, the sequence should repeat. If both of the status flip-flops are in the false state, that means that the output unit of the pilot is malfunctioning and the sampling circuitry should provide a transfer power signal to the registers A, B and C. If the flip-flops are in opposite states, that is, one is in the true state and the other is in the false state, the sampling circuitry should provide an output signal which causes the programming control unit to jump to the self check sub-routine.

Figure 5A:
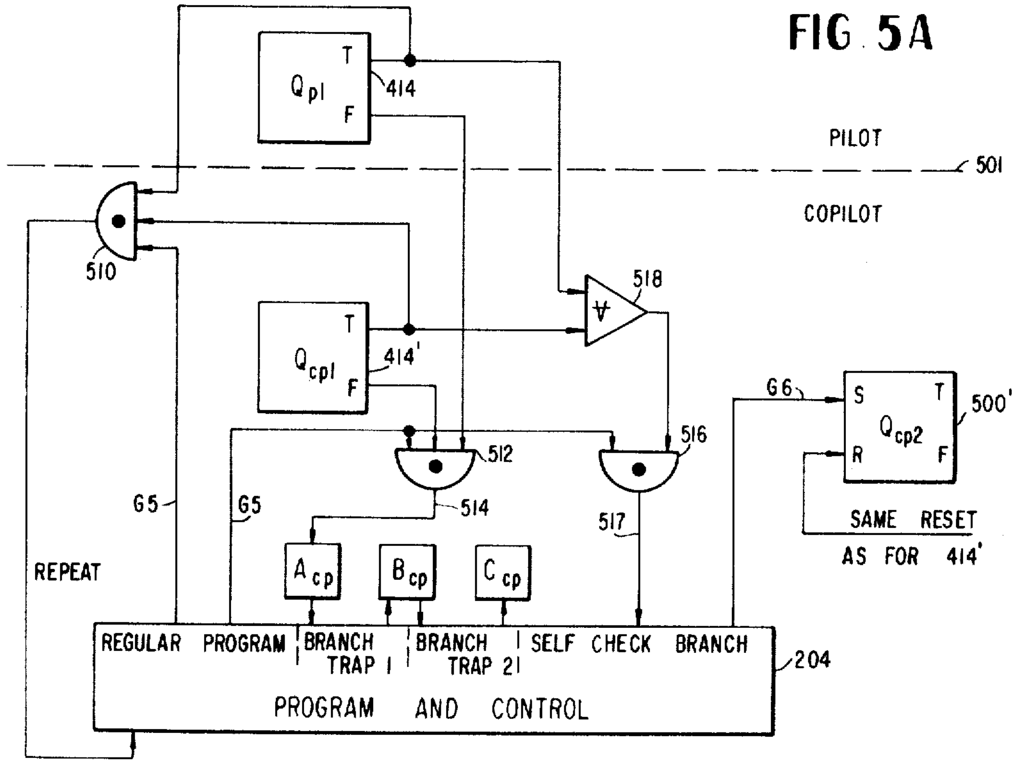
Figure 5B:
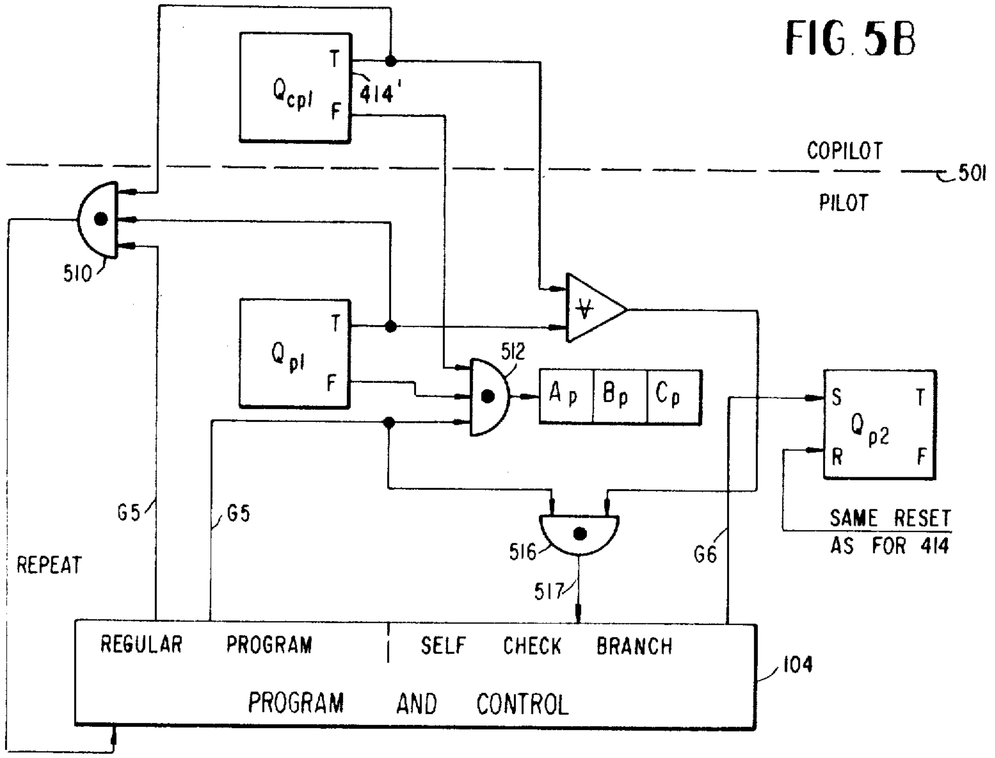

Sampling occurs in both the pilot and the copilot. The systems for performing the sampling are parts of the pilot and the copilot processor units respectively. Preferred embodiments of the system are shown in FIGURES 5A and 5B. The logical gates, i.e. and the AND and exclusive OR's shown in FIGURES 5A, 5B, 6A and 6B, are not necessarily discrete hardware gates. Their funcitions may be performed by the computer program in association with hte memory and processor parts of the pilot and copilot computers respectively. Logical functions of AND and exclusive OR are general operations of computers and are well known in the art. FIGURE 5A shows the sampling system of the copilot, and FIGURE 5B shows the sampling system of the pilot. The lead lines which cross dotted line 501 are lines of communication between the pilot and the copilot computers.

Following the operation of the system shown in FIGURE 4, sampling take place in response to a signal on leads $G_5$ from the programming and control unit. Conditioning signals are applied to the functional AND gates 510, 512 and 516, and although all signals occur simultaneously as shown herein, they may be applied in sequence if preferred. The true outputs are AND'ed in gate 510 whose output is a repeat signal which is applied to the programming control unit. Thus, if both status flip-flops are in the true state, the copilot will repeat the regular program, this being the calculation of the digital flight equation (in our example) followed by the output check operation (FIGURE 4) and the status sampling operation (FIGURES 5A and 5B).

If the status flip-flops are in opposite states, there will be an output from exclusive OR gate 518. The latter output is gated through AND gate 516 and provides a signal on leads 517 which controls branching operation to the self-check sub-routine. As pointed out above, many systems and methods are known for causing computers to jump or branch to sub-routine programs. Also, self-check sub-routines are well known. The important point to note with respect to the present invention is that the sampling means causes the copilot to jump or branch to the self-check-routine when the status flip-flops are in opposite state. Note, flip-flop 500' is reset at the same time flip-flops $Q_{p1}$ and $Q_{cp1}$ are put in the reset state. This is accomplished by merely tying the reset input of $Q_{cp1}$ flip-flop 414' to the reset input of the $Q_{cp2}$ flip-flop 500'. Also, referring to FIGURE 5B, the same is accomplished with respect to $Q_{p2}$ flip-flop 500 and $Q_{p1}$ flip-flop 414 (FIGURE 4). At the end of the self-check sub-routine, a signal is applied on lead $G_6$ to set $Q_{cp2}$ flip-flop 500' only if there is no malfunction discovered during the self-check routine. If there is a malfunction discovered, $Q_{cp2}$ flip-flop 500' will not be set thereby remaining in the false state.

The same system as described with respect to the sampling in the copilot, applied equally as well to the sampling of the status flip-flops in the pilot. The pilot sampling circuitry, shown in FIGURE 5B, is the same as that for the copilot except for the output of AND gate 512. The outputs from AND gate 512 in the copilot, and from AND gate 512 in the pilot occur when $Q_p$ and $Q_{cp}$ are in the false state and indicates that a transfer of power from the pilot output circuitry to the copilot output circuitry should occur. The latter is accomplished by setting flip-flops $A_p$, $B_p$ and $C_p$ in the pilot and/or by setting flip-flops $A_{cp}$, $B_{cp}$ and $C_{cp}$ in the copilot as shown in FIGURES 3A and 3B. Although the simplest procedure would be to set A, B and C flip-flops directly in response to the transfer of power signal from AND gate 512, it is not necessarily the best way.

It is possible for a computer to run away and erroneously set either A, B or C. For example, if the outputs are arranged such that the setting of $A_p$ causes the setting of $B_p$ which in turn causes setting of $C_p$, the erroneous setting of $A_p$ could cause the settings of $B_p$ and $C_p$ and power would be transferred even though the status flip-flops do not both indicate a false condition. In the pilot this would not be a bad thing because if A, B and C were set falsely, it would be an indication of some malfunction in the pilot and therefore a transfer power would be desirable. On the other hand, if the same sequenice was used in the copilot, the erroneous setting of $A_{cp}$ would further cause an erroneous setting of $B_{cp}$ and $C_{cp}$ resulting in a transfer of power from the pilot to the copilot when the copilot is malfunctioning. To guard against a run away in the copilot causing transfer of power to the copilot, software traps such as those described previously are used.

The name "software trap" is used for the sub-routine program, because programs are often referred to as software and in this instance the function of the program is to trap the signal which would otherwise set $B_{cp}$ and $C_{cp}$. As a particular example, the software traps may be identical to the well known self-check routine sub-routine which provides an output to set $B_{cp}$ or $C_{cp}$ only if no errors are detected.

Referring again to FIGURE 5A, the transfer power signal on lead 514 set $A_{cp}$ only. When $A_{cp}$ is set, it provides an output which causes the program to branch or jump to the sub-routine which is referred to as branch trap No. 1. If the sub-routine operation is performed correctly, an output will be applied to $B_{cp}$. When $B_{cp}$ is set, it provides an output which then causes the program to branch or jump to a sub-routine program which is referred to a branch trap No. 2. If the operation performed by this software trap is correct, an output is provided to $C_{cp}$.

As thus far explained, the system repeats the regular program when the $Q_{p1}$ and $Q_{cp1}$ flip-flops are both in the true state, and transfers power from the pilot to the copilot when the $Q_{p1}$ and $Q_{cp1}$ flip-flops are both in the false state. Also, as has been explained and shown in FIGURES 5A and 5B, the copilot and pilot both enter into self-check routines when the $Q_{cp1}$ and $Q_{p1}$ flip-flops are in opposite states, and the self-check routines set the $Q_{cp2}$ and $Q_{p2}$ flip-flops respectively if no malfunction is detected. Thus, at that point, the states of flip-flops $Q_{p2}$ and $Q_{cp2}$ determine whether or not the regular program should be repeated with power remaining in the pilot output unit or whether power should be transferred to the copilot output unit. If $Q_{p2}$ flip-flop 500 is in the true state, indicating that there is no malfunction in the pilot, the regular program should be repeated. On the other hand, if $Q_{p2}$ is in the false state indicating a malfunction in the pilot, and $Q_{cp2}$ is in the true state indicating no malfunction in the copilot, power should be transferred from the pilot output to the copilot output.

Figure 6A:
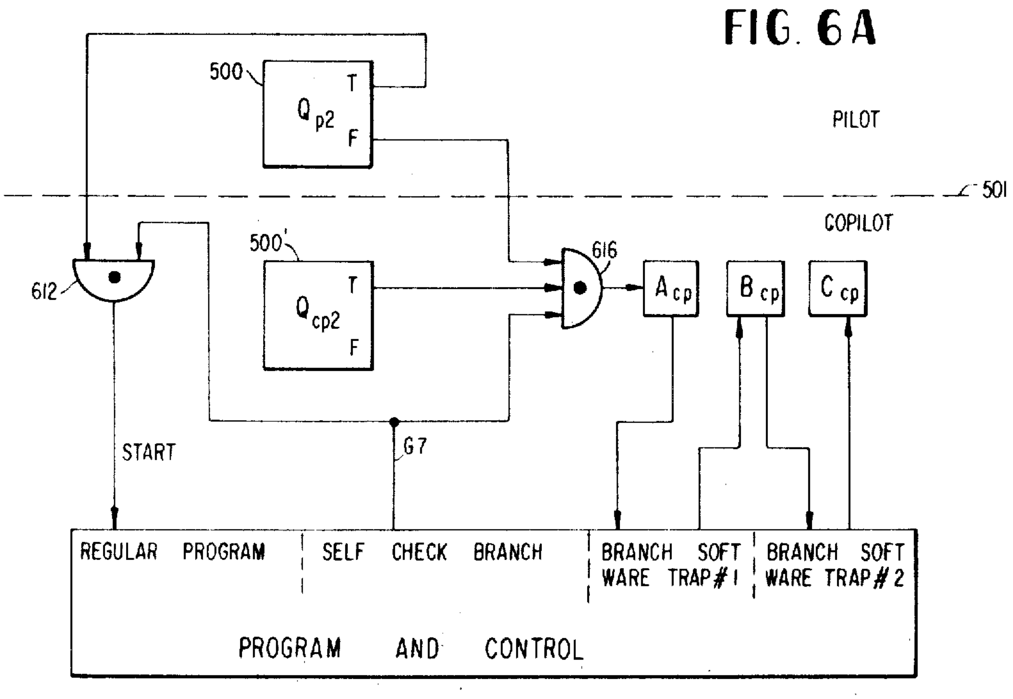
Figure 6B:
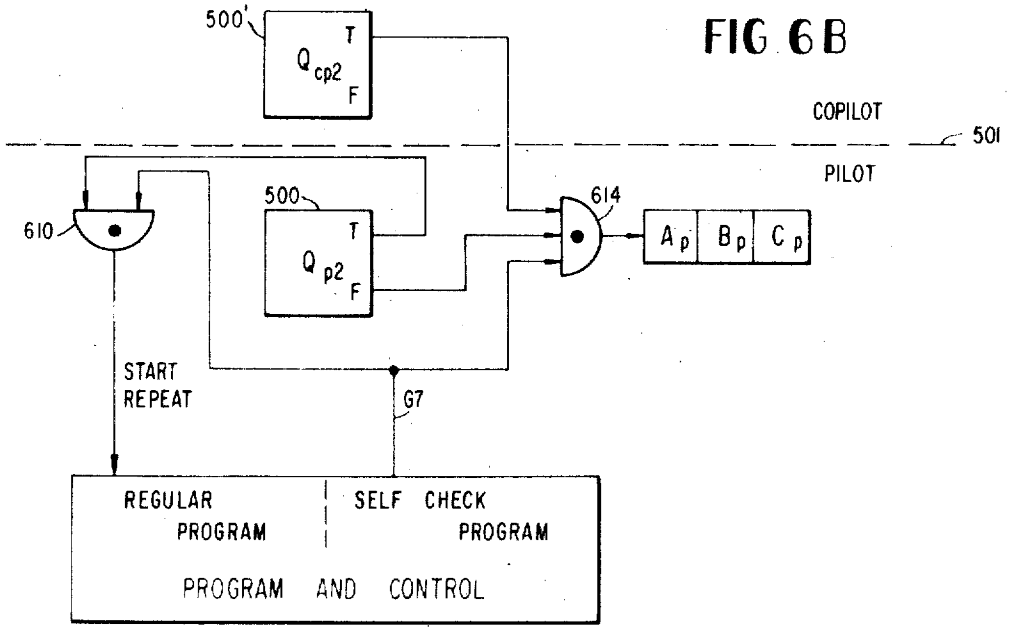

Apparatus for performing a check on the states of flip-flops $Q_{p2}$ and $Q_{cp2}$ is shown in FIGURES 6A and 6B. FIGURE 6A shows the copilot system for checking the flip-flop status and FIGURE 6B shows the pilot system for checking the flip-flop status. In both figures the dash line 501 indicates separation between the pilot and copilot, and leads crossing the dash line communicate between both the pilot and the copilot as indicated.

Following the last sequence described in FIGURES 5A and 5B with respect to the self-check sub-routine, the self-check sub-routine provides a sampling output signal on leads $G_7$ in both the pilot and copilot. If flip-flop $Q_{p2}$ is in the true state, AND gate 610 in the pilot sends a repeat signal to the regular program and AND gate 612 in the copilot sends a repeat signal to the regular program. It should be noted that if $Q_{p2}$ is in the true state, the state of $Q_{cp2}$ is unimportant. That is because in either case the pilot should remain in control. If both $Q_{p2}$ and $Q_{cp2}$ are in the true state, that means there is no malfunction and that the error which caused $Q_{p1}$ and $Q_{cp1}$ (FIGURE 5) to be in opposite states was merely transient. Furthermore, if $Q_{p2}$ is in the true state and $Q_{cp2}$ is in the false state, that means that the error which caused $Q_{p1}$ and $Q_{cp1}$ to be in opposite states was caused by the malfunction in the copilot and therefore the pilot should remain in control.

AND gate 614 in the pilot and AND gate 616 in the copilot are responsive to the false output of $Q_{p2}$ and the true output of $Q_{cp2}$. When the latter condition occurs, AND gates 614 and 616 provide the transfer power signal which in the pilot, as explained with respect to FIGURE 5B, sets $A_p$, $B_p$ and $C_p$ sequentially, and in the copilot sets $A_{cp}$ followed by branching to software trap No. 1 followed by setting $B_{cp}$, followed by branching of software trap No. 2, followed by setting of $C_{cp}$.

Thus the system as described is one which makes use of the components of the computers themselves for providing a continuous checking operation. If a failure occurs anywhere in the pilot, the system operates to transfer power to the copilot and even though the pilot and copilot computers enter into the control the transferring of power, the run away or lock-up of the pilot will not prevent transfer, and the run away or lock-up of the copilot will not cause a transfer. Since all systems and function are redundant, maximum reliability is achieved without the necessity for a third reference which has no dual.

Figure 7:
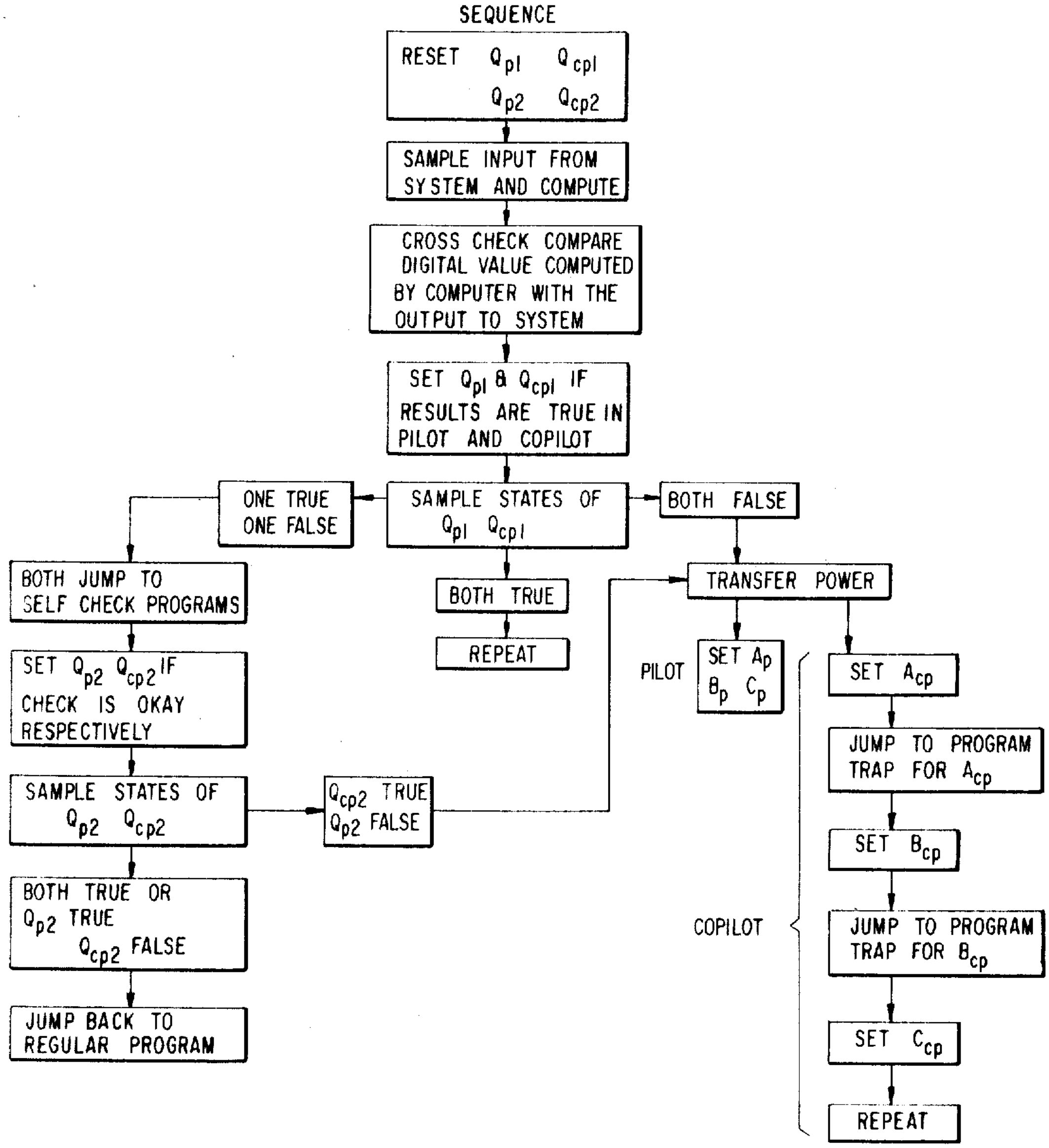
FIGURE 7 is a word diagram illustrating the steps in the dual redundancy system of the present invention.

The overall sequence of operation is shown diagrammatically by the flow diagram of FIGURE 7.

While the invention has been particularly shown and described with reference to preferred embodiments thereof, it will be understood by those skilled in the art that various changes in form and details may be made therein without departing from the spirit and scope of the invention

What is claimed is:

1. A computer system having two computers, pilot and copilot, both of which accept the same system inputs and operate on said system inputs to generate a respective internal output fed into a pilot and a copilot output unit, and wherein only the pilot normally transfers its internal output from the pilot output unit to a system output, comprising:

(a) a first two state device in said pilot, (b) a second two state device in said copilot, (c) said first and second two state devices being normally in a first state, (d) means in said pilot for comparing said system output with said pilot internal output and for altering the state of said first two state device when said system output and said pilot internal output differ by more than a predetermined limit, (e) means in said copilot for comparing said system output with said copilot internal output and for altering the state of said second two state device when said system output and said copilot internal output differ by more than a predetermined limit, (f) power transfer means coupled to said pilot and copilot output units for normally coupling power to said pilot output unit but not to said copilot output unit, and transferring power from said pilot output unit to said copilot output unit upon initiation for rendering said copilot unit operative thereby, (g) means in said pilot coupled to said power transfer means, being responsive to said first and second devices for initiating said power transfer means when said first and second devices are in a second state, and (h) means in said copilot coupled to said power transfer means, being responsive to said first and second devices for initiating said power transfer means when said first and second devices are in a second state.

2. The system as defined in claim 1 further comprising, (a) a third two-state device in said pilot and fourth two-state device in said copilot, said third and fourth two-state devices normally being in a first state, (b) means in said pilot coupled to and responsive to said first and second devices when in opposite states for causing said pilot to enter into a self-check sub-routine program, said self-check sub-routine being of the type which checks the computer apparatus and provides an output if all systems are properly functioning, (c) means connecting the last-mentioned output to said third two-state device for altering the state of said third two-state device, (d) means in said copilot coupled to and responsive to said first and second devices when in opposite states for causing said copilot to enter into a self-check sub-routine program, said self-check sub-routine being of the type which checks the computer apparatus and provides an output if all systems are properly functioning, (e) means connecting the last-mentioned output to said fourth two-state device for altering the state of said fourth two-state device, (f) means in said pilot coupled to and responsive to said third device when in a first state and said fourth device when in a second state for initiating said power transfer control means, and (g) means in said copilot coupled to and responsive to said third device when in a first state and said fourth device when in a second state for initiating said transfer control means.

3. The system as defined in claim 2 and further comprising:
(a) means in said pilot connected to said second device for resetting said second device in said first state once for each computer cycle, and
(b) means in said copilot connected to said first device for resetting said first device in said first state once for each computer cycle.

4. The system as defined in claim 2 and further comprising:
(a) means in said pilot connected to said second and fourth devices for setting said second and fourth devices to said first state once for each computer cycle, and
(b) means in said copilot connected to said first and third devices for setting said first and third devices to said first state once for each computor cycle.

5. The system as defined in claim 1 wherein said power transfer means comprises:
(a) a power supply buss,
(b) first, second and third electrically energizable switch means adapted to be energized in response to the occurance of an initiation signal in said pilot or said copilot,
(c) means responsive to the de-energized condition of any two of said first, second and third switch means for connecting said power supply buss to said output unit of said pilot, and
(d) means responsive to the energization of any two of said first, second and third switch means for connecting said power supply buss to said output unit of said copilot.

6. The system as defined in claim 2 wherein said power transfer means comprises:
(a) a power supply buss,
(b) first, second and third relays adapted to be energized in response to the occurrence of an initiation signal in said pilot or said copilot,
(c) means responsive to the de-energized condition of any two of said first, second and third relays for connecting said power supply buss to said output unit of said pilot, and
(d) means responsive to the energization of any two of said first, second and third relays for connecting said power supply buss to said output unit of said copilot.

7. The system as defined in claim 1 wherein said power transfer means comprises:
(a) a power supply buss normally connected to said pilot output unit.
(b) means responsive to the occurrence of an initiation signal in said pilot or said copilot for providing a plurality of descrete outputs, and
(c) means responsive to the occurrence of a majority of said plurality of discrete outputs for disconnecting said power supply buss from said pilot output unit and connecting said power supply buss to said copilot output unit.

8. The system as claimed in claim 1 wherein said power transfer means comprises:
(a) a power supply buss,
(b) first normally closed electrically energizable switch means connecting said buss to the output circuits of said pilot computer when closed,
(c) second normally open electrically energizable switch means for connecting said buss to the output circuits of said copilot computer when closed,
(d) first, second and third switch controlling devices in said pilot responsive to said pilot initiating means for closing said second switch means and for opening said first switch means,
(e) fourth, fifth and sixth switch controlling devices in said copilot responsive to said copilot initiating means for closing said second switch means and for opening said first switch means.

9. The system as claimed in claim 8 further comprising program branching control means responsive to the initiation of said fourth switch controlling device for causing said copilot computer to enter into a self-check routine and provide an output if no errors are detected, said latter output being connected to initiate said fifth switch controlling device.

10. The system as claimed in claim 9 further comprising program branching control means responsive to the initiation of said fifth switch controlling device for causing said copilot computer to enter into a self-check routine and provide an output if no errors are detected, said latter output being connected to initiate said fifth switch controlling device.

11. The system as defined in claim 2 wherein said first, second, third and fourth two-state devices comprise flip-flops or registers interconnecting said pilot and said copilot computers.

References Cited

UNITED STATES PATENTS

| | | | |
|---|---|---|---|
| 2,950,464 | 8/1960 | Hinton et al. | 340—172.5 |
| 3,303,474 | 2/1967 | Moore et al. | 340—172.5 |
| 3,309,672 | 3/1967 | Brun et al. | 340—172.5 |
| 3,348,197 | 10/1967 | Akers et al. | 340—172.5 |
| 3,377,623 | 4/1968 | Reut et al. | 340—172.5 |
| 3,252,149 | 5/1966 | Weida et al. | 340—172.5 |

ROBERT C. BAILEY, *Primary Examiner.*

JOHN P. VANDENBURG, *Assistant Examiner.*

U.S. Cl. X.R.

340—146.1